Figures 1, 3, 4:
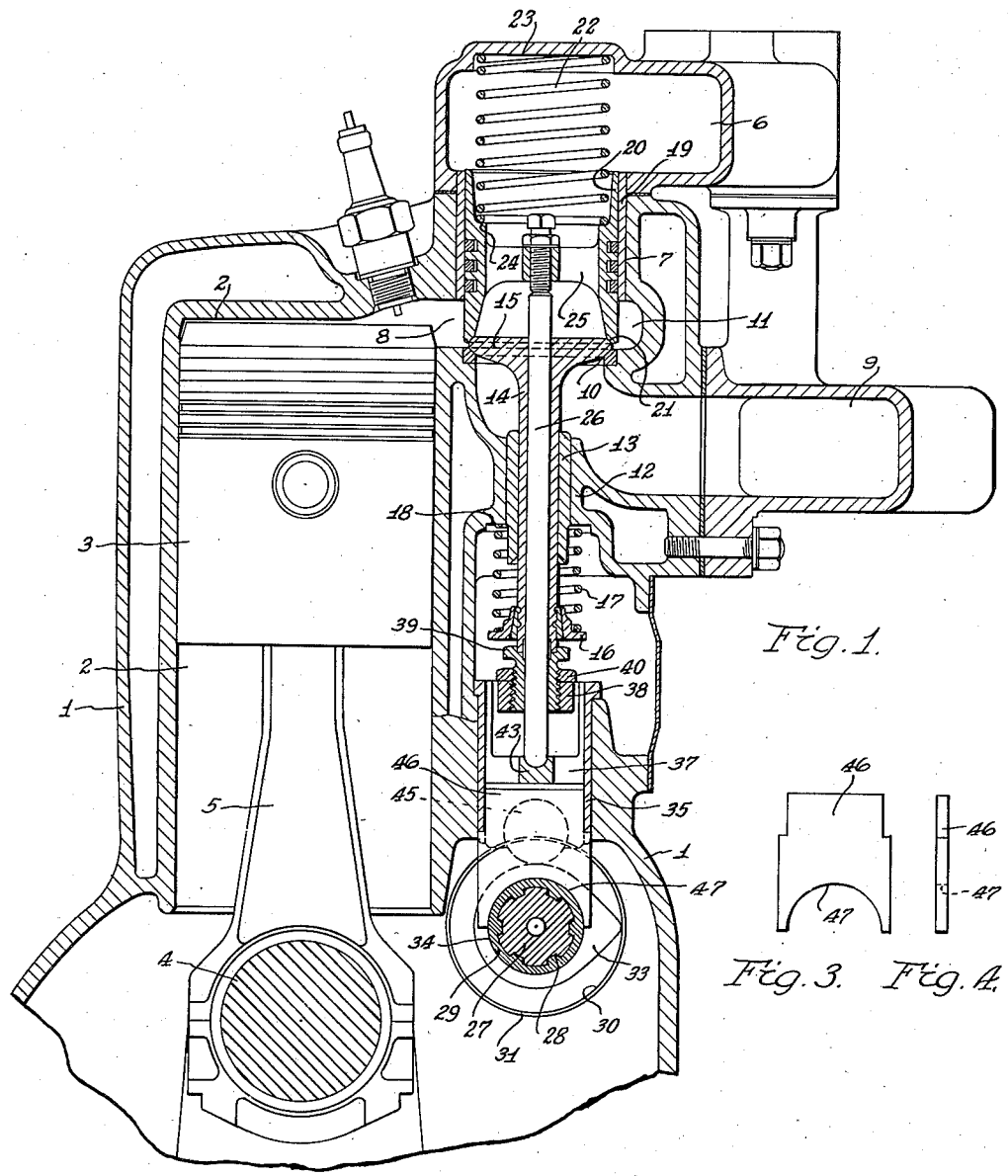

March 12, 1940.  W. J. HUBER  2,192,913
INTERNAL COMBUSTION ENGINE VALVE
Filed April 10, 1937  2 Sheets-Sheet 1

INVENTOR
William J. Huber
BY
ATTORNEYS

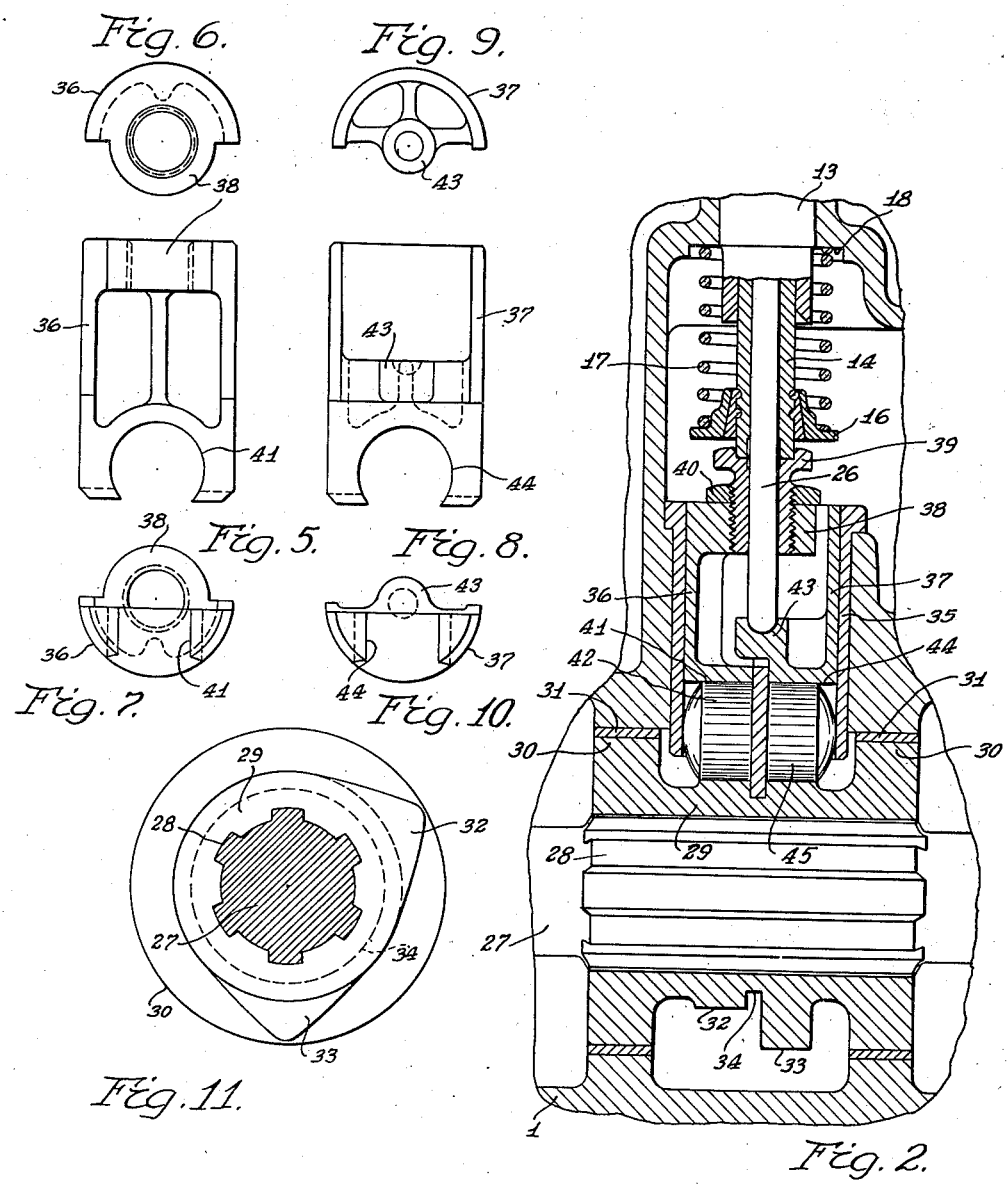

Patented Mar. 12, 1940

2,192,913

UNITED STATES PATENT OFFICE 2,192,913

INTERNAL COMBUSTION ENGINE VALVE

William J. Huber, Detroit, Mich., assignor to Mell A. Bolton, Detroit, Mich.

Application April 10, 1937, Serial No. 136,103

6 Claims. (Cl. 123—188)

The present invention relates to internal combustion engines and to mechanically operated intake and exhaust valves therefor.

Internal combustion engines, particularly of the four-stroke cycle type, usually employ poppet valves for controlling the intake and exhaust ports of the combustion chamber, the valves being substantially separated and entirely independent in their action. That is, the valves are usually opened by individual cam means or the equivalent on a shaft which is geared to the crank shaft to rotate at one-half the engine speed and are closed by springs. This invention has as its primary object to provide a valve structure for internal combustion engines wherein the intake and exhaust valves and their operating means are combined into a unitary structure which results in greater efficiency in engine operation. With this object in view, the combustion chamber is provided with a single port and means of communication is provided between this port and both the intake and exhaust manifold, there being a poppet valve controlling communication between this port and the exhaust manifold and a sleeve valve controlling communication between this port and the intake manifold. The poppet valve has individual spring means normally holding it on its seat and individual mechanical means for moving it from its seat, whereas the sleeve valve has spring means normally seating it upon the poppet valve and individual mechanical means for moving it from engagement with the poppet valve. During opening and closing movement of the exhaust valve the sleeve or intake valve moves in unison therewith, thus permitting exhaust of burned gases from the combustion chamber while preventing communication between the intake manifold and the combustion chamber. At the time the sleeve valve or intake valve is moved from its seat on the exhaust valve the exhaust valve is maintained on its seat by its spring closing means.

An important advantage resulting from the valve arrangement constructed and operated as above described is a marked improvement in thermal efficiency of the engine. The valve arrangement causes the comparatively cool intake gases to maintain the exhaust valves at a lower temperature than is possible with conventional valve arrangements, thereby eliminating preignition which results from overheating of the exhaust valve, and makes possible higher compression pressures in the engine.

The co-axial grouping of the intake and exhaust valves permits valve areas to be materially increased without enlargement of the engine structure, as compared to conventional engines having the usual poppet valves controlling separate intake and exhaust ports. Enlargement of the valve areas is particularly important in the case of high speed engines, either for automotive, marine or aircraft use, and especially in cases where lightness of weight and compactness are essential or desirable, providing such enlargement of the valve areas may be accomplished without materially increasing weight or over-all dimensions, because enlargement of the valve areas permits the compressed burned gases to be completely exhausted at the completion of the scavenging stroke of the piston. When considered in the light that a compression pressure of ten pounds would represent approximately twenty-five per cent of the volume of the fuel charge contained in the combustion chamber at the time of combustion, it is apparent that freedom of exhaust of the burned gases is important, and that if such freedom is not present the piston on its scavenging stroke has a tendency to compress a portion of the exhausting gases, and such compressed gases would be present in the combustion chamber at the time the combustible charge is subsequently supplied thereto.

Another object of the present invention is to provide a valve structure of the character above referred to wherein the suction created by the intake stroke of the piston has no tendency to unseat the intake valve. Greater engine efficiency at high speeds is thus attained through elimination of any tendency for the intake valve actuation being effected by the low pressure of the fuel charge during the suction stroke or at the beginning of the compression stroke of the piston.

Another object of the invention is to provide an intake valve and an exhaust valve arrangement for internal combustion engines wherein the two valves are co-axial and are actuated by cams on a shaft geared to the crank shaft of the engine to rotate at one-half the engine speed. The two cams of each set relating to the intake and exhaust valves of each cylinder are closely grouped and this close grouping permits the provision of bearings at each side of each set of cams.

With the above and other ends in view the invention is more fully disclosed with reference to the accompanying drawings, in which Figure 1 is a vertical section;

Fig. 2 is a fragmental vertical section taken in a plane at right angles to Fig. 1;

Fig. 3 is a side elevation of a detail;
Fig. 4 is an edge view corresponding to Fig. 3;
Fig. 5 is an elevation of a detail;
Figs. 6 and 7 are opposite end views relating to Fig. 5;
Fig. 8 is an elevation of a detail;
Figs. 9 and 10 are opposite end views thereof, and
Fig. 11 is a view illustrating the cams.

Like characters of reference are employed throughout to designate corresponding parts.

The numeral 1 designates an internal combustion engine having a combustion chamber 2 with a piston 3 slidable therein and connected to the crank arm 4 by a connecting rod 5. The numeral 6 designates an intake manifold and 7 a bore extending downwardly from said manifold and communicating with a port 8 which opens into the combustion chamber 2. The exhaust manifold 9 communicates with a valve seat 10 which opens into the annular enlargement 11 at the bottom of the bore 7.

Mounted in the engine structure 12 adjacent the exhaust manifold 9 is a valve stem guide 13 and slidably received in the valve stem guide 13 is a tubular valve stem 14 having a poppet valve 15 on its upper end adapted to seat upon the valve seat 10. Secured upon the hollow stem 14 is a spring retainer 16 and a coiled spring 17 is compressed between the retainer 16 and a shoulder 18 and normally biases movement of the hollow stem 14 to seat the poppet valve 15 upon the valve seat 10.

Mounted in the bore 7 is a cylindrical bearing 19 and slidably received in the bearing is a sleeve valve 20. The sleeve valve 20 has its open upper end in constant communication with the intake manifold 6 and its lower end formed as at 21 whereby it seats upon the upper end of the poppet valve 15. A coiled spring 22 is compressed between the wall 23 of the manifold 6 and a shoulder 24 on the sleeve valve 20 and normally holds the sleeve valve in seating engagement with the upper end of the poppet valve 15. Internal radial arms 25 are provided within the sleeve valve 20 and a valve stem 26 is connected thereto and extends downwardly through the hollow valve stem 14.

Mounted in the engine structure beneath the stems 14 and 26 is a cam shaft 27 with splined portion 28 thereon. Mounted upon the splined portion of the shaft 27 is a body 29 having cylindrical portions 30 at each end thereof received in anti-friction bearings 31 in the engine structure. Between the two bearings are provided two cams 32 and 33 separated by a circumferential groove 34. Mounted in coaxial alinement with the valve stems 14 and 26 is a cylindrical bearing 35 receiving two semi-cylindrical slidable elements 36 and 37 respectively. The slidable element 36 has an ear 38 thereon supporting a vertically adjustable element 39 for engagement with the lower end of the hollow valve stem 14, there being a lock nut 40 provided on a vertically adjustable member 39 in order that it may be held in various positions of adjustment. In its lower end the slidable element 36 is formed with a substantially cylindrical socket 41 in which is received a roller 42 for contact with the cam 32. The slidable element 37 has an internal lug 43 adapted when moved vertically to engage the lower end of the stem 26 and a substantially cylindrical socket 44 in the lower end thereof receiving a roller 45 which engages the cam 33.

When the two sliding elements 36 and 37 are placed in the relationship shown in the drawings there is tendency for the two to rotate bodily within the bearing 35. In order to prevent such rotation a retainer 46, shown in detail in Figs. 3 and 4, is provided with a semi-circular recess 47 in its lower end which fits into the groove 34. The upper end of the retainer 46 extends between the rollers 42 and 45 and the slidable elements 36 and 37 and inasmuch as the retainer 46 is held against rotation by engagement with side walls of the groove 34 it prevents rotation of the slidable elements 36 and 37 in the bearing 35.

With the piston 3 in the position shown in Fig. 1, both the intake and the exhaust valve are closed. As the piston 3 descends, however, the cam 33 moves the slidable element 37 and the valve stem 26 upwardly to unseat the sleeve valve 20 from the poppet valve 15 thereby permitting a fuel charge to be drawn from the manifold 6 through the sleeve valve 20 and into the combustion chamber 2. After completion of the intake stroke of the piston 2 the cam 33 permits the sleeve valve 20 to be seated upon the poppet valve 15 through the action of the spring 22. After combustion of the fuel charge has taken place and the piston 3 again moves upwardly the cam 32 elevates the slidable element 36 and the tubular valve stem 14 to unseat the poppet valve 15 so that the burned gases may be expelled from the combustion chamber 2 through the port 8 and valve seat 10 to the exhaust manifold 9. While the poppet valve is held from its seat by the cam 32 the sleeve valve 20 is maintained in contact therewith by the spring 22 and due to this contact the intake manifold is maintained out of communication with the combustion chamber until the burned gases have been completely exhausted therefrom.

Due to the fact that the fuel charge entering the combustion chamber from the intake manifold 6 is at a comparatively low temperature these gases tend to cool the poppet valve 15. It will be noted, however, that at the time combustion takes place substantially the entire top surface of the poppet valve is covered and instead of being subjected to the heat of combustion is contacted by comparatively cool gases in the intake manifold.

From the above it is apparent that a number of advantages in operation are present, additionally to those pointed out.

Due to the fact that the port 8 is located in the end zone of the cylinder beyond the limit of the piston stroke, the port is not controlled by the piston, thus ensuring that the timing of the port can be controlled with the assurance of obtaining maximum efficiency. And due to the fact that the single port is utilized for both intake and exhaust, the control of the port can be obtained by locating the controlling valves in axial alinement, with the axes parallel with the cylinder axis and with the axis respective flow-paths on the opposite side of the port from the axis of the cylinder, and thus beyond the direct pressure of the piston.

The control of the intake flow path is by the sleeve valve in co-operation with the poppet valve, the two valves, when closed having the sleeve valve seated upon the outer face of the poppet valve. Hence, at such time, the outer face of the poppet valve is being bathed by the fuel content of the intake flow path. When the sleeve valve is raised to admit fuel to the port, the flowing fuel continues to bathe this face of the poppet valve. Hence, at all times, this face of the poppet valve is being bathed with the cooler intake content, with the result that this face of the poppet valve does not become warped or disintegrated by the exhaust gas action, but retains the seating face for the sleeve valve—the seat being carried by the poppet valve—intact and efficient to ensure proper action of the engine. And because of the latter, it is possible to carry the operating rod 26 of the sleeve valve directly through the poppet valve itself including such outer face, thus exposing the upper end of this rod to the cooling action of the fuel content and thereby tending to retain the latter cool, with its resultant effect upon the stem of the poppet valve which is intermittently bathed with the exhaust gases.

The inner face and stem of the poppet valve lies in the flow path of the exhaust gases, the seat for this valve being permanently positioned. Since such gas bathing is intermittent instead of constant, while the fuel bathing of the outer face is constant, the body of the poppet valve is retained within reasonable temperature conditions, due to the fact that heat dissipation is provided rapidly through the presence of the elements which themselves are in constant contact with the cool fuel—the sleeve valve, the outer face of the poppet valve, and the operating rod 26. And since the annular seating face for the sleeve valve is opposite the permanent seat for the poppet valve, the latter seat remains at reasonable temperatures, preventing warping of the poppet valve, and thereby retaining the integrity of the valve closure in both directions.

While the sleeve value is directly exposed to the pressures and temperatures of the firing activities within the cylinder, the circular shape of the valve will withstand the pressures, and the valve itself is retained at reasonable temperatures through the fact that it is being internally bathed with the cool fuel at all times.

As a result, the feeding of the fuel and the expulsion of the exhaust gases can be provided under conditions of maximum efficiency, and with an assurance of comparatively long life for the poppet valve, as well as permitting assurance of efficient action of the operating mechanisms for the valves, since the temperature conditions remain reasonably low to prevent gripping of elements.

Although a specific embodiment of the invention has been illustrated and described it will be understood that various changes may be made within the scope of the appended claims without departing from the spirit of the invention and such changes are contemplated.

What I claim is:

1. In combination with an internal combustion engine having a poppet valve and a sleeve valve co-axially related, one valve having a hollow actuating stem and the other having an actuating stem extending therethrough, a pair of cams, a cylindrical bearing between the cams and valves and disposed co-axial with said actuating stems, a pair of substantially semi-cylindrical elements slidably received in said bearing and engaging respective cams, one of said elements being connected to said hollow stem, and means on the other element adapted to engage the other stem incident to movement of said element by its respective cam.

2. In combination with an internal combustion engine having a poppet valve and a sleeve valve co-axially related, one valve having a hollow actuating stem and the other having an actuating stem extending therethrough, a pair of cams, a cylindrical bearing between the cams and valves and disposed co-axial with said actuating stems, a pair of substantially semi-cylindrical elements slidably received in said bearing and engaging respective cams, means for preventing rotation of said elements in said bearing, one of said elements being connected to said hollow stem, and means on the other element adapted to engage the other stem incident to movement of said element by its respective cam.

3. In an internal combustion engine, wherein the piston cylinder communicates with the fuel intake flow path and with the exhaust flow path through a single port permanently exposed in the cylinder, and wherein the intake flow path and the exhaust flow path are in axial alinement in the vicinity of such port with the flow path axis extending substantially parallel with the cylinder axis and with such axes on opposite sides of the port, the combination with such assembly of means for controlling communication between said port and the respective flow paths, said means including a sleeve valve for the intake flow path, a poppet valve for the exhaust flow path, and independent means for controllably moving said valves to and from a port-closing position, said valves being axially alined with the sleeve valve co-operating with the outer face of the poppet valve to close the intake from such port, the inner face of the poppet valve being co-operative with a permanently-positioned valve seat to control communication between the exhaust flow path and the port, said valves, in closed position combinedly closing the port with the sleeve valve movable individually when opening the intake flow path and movable with and by the poppet valve when opening the exhaust flow path, the operating means for the sleeve valve extending axially through the poppet valve, whereby the outer face of the poppet valve is constantly bathed with the fuel content of the intake flow path to prevent poppet valve warping and to maintain integrity of the seat relationship between the valves.

4. An assembly as in claim 3 characterized in that the poppet valve and stem are formed with an axial bore through which the operating means for the sleeve valve extends to thereby place a zone of such operating means in exposed relation within such intake flow path and subject to the constant bathing of the fuel, whereby exposure of the exhaust gases is limited to the under face and stem of the poppet valve, with the sleeve valve and its operating means active to provide rapid heat dissipation of the poppet valve during the period of exhaust discharge into and through the exhaust flow path.

5. In an internal combustion engine having a piston cylinder and a down-draft fuel mixture passage communicative with the cylinder through a port, a downwardly-opening exhaust port in the passage and below said first-named port and arranged with the outer end surface thereof facing inwardly of the fuel flow passage, and a sleeve valve positioned in the fuel mixture passage above said poppet valve and active in the control of said first-named port, said sleeve valve having a passage therethrough for flow of the fuel mixture against the upper surface of said poppet valve to thereby cool said poppet valve, said sleeve valve being movable relative to said poppet valve to control said first-named port and seatable on and movable with said exhaust valve on exhaust to protect said poppet exhaust valve from the heat of the exhaust gases.

6. In an internal combustion engine having a piston cylinder and a down-draft fuel mixture flow passage communicative therewith through a port, an exhaust port for the passage, an exhaust valve having a hollow stem and controlling said exhaust port, an open ended sleeve valve seatable on the upper surface of said exhaust valve to protect said exhaust valve from the heat of combustion with the sleeve valve active in the control of fuel flow through the fuel mixture port, a stem for said sleeve valve and slidably received and guided in said hollow stem, said sleeve valve being movable relative to said exhaust valve, and means to actuate said valves.

WILLIAM J. HUBER.